United States Patent
Herling et al.

(10) Patent No.: US 10,205,791 B2
(45) Date of Patent: Feb. 12, 2019

(54) METHOD AND SYSTEM FOR SPEED AND DIRECTIONAL CONTROL OF RESPONSIVE FRAME OR ASSET

(71) Applicant: DialApp, Inc., Gig Harbor, WA (US)

(72) Inventors: William H. Herling, Gig Harbor, WA (US); Samuel J. May, Gig Harbor, WA (US); Spencer Fornaciari, Seattle, WA (US)

(73) Assignee: DialApp, Inc., Gig Harbor, WA (US)

( * ) Notice: Subject to any disclaimer, the term of this patent is extended or adjusted under 35 U.S.C. 154(b) by 414 days.

(21) Appl. No.: 14/966,981

(22) Filed: Dec. 11, 2015

(65) Prior Publication Data

US 2016/0173627 A1 Jun. 16, 2016

Related U.S. Application Data

(60) Provisional application No. 62/090,830, filed on Dec. 11, 2014.

(51) Int. Cl.
| | |
|---|---|
| *G06F 15/16* | (2006.01) |
| *H04L 29/08* | (2006.01) |
| *G06F 3/0488* | (2013.01) |
| *H04L 12/58* | (2006.01) |

(52) U.S. Cl.
CPC .......... *H04L 67/22* (2013.01); *G06F 3/04883* (2013.01); *H04L 51/10* (2013.01)

(58) Field of Classification Search
CPC ....................................................... H04L 67/22
USPC .................................................. 709/205, 223
See application file for complete search history.

(56) References Cited

U.S. PATENT DOCUMENTS

| | | | |
|---|---|---|---|
| 8,497,920 B2 | 7/2013 | Levoy et al. | |
| 8,736,716 B2 | 5/2014 | Prentice et al. | |
| 2007/0146347 A1* | 6/2007 | Rosenberg | G06F 3/04883 345/173 |
| 2013/0080895 A1* | 3/2013 | Rossman | G06F 3/04883 715/720 |
| 2014/0178047 A1* | 6/2014 | Apodaca | G06F 3/041 386/248 |

FOREIGN PATENT DOCUMENTS

WO 2009150292 A1 12/2009

* cited by examiner

*Primary Examiner* — Philip B Tran
(74) *Attorney, Agent, or Firm* — Perkins Coie LLP

(57) ABSTRACT

Disclosed are method and apparatus either of which enables a user to capture a burst of photographs or other asset, such as for example collections of audio recordings, and subsequently display the captured burst of photographs and/or other asset such as sound (which together may form content) on a mobile device. The user interacts with the content by way of gesture or action, controlling the speed and directional movement of the collection of frames and/or other assets. Through the interaction of a user, content can be consumed with greater accuracy and finer detail. A variety of gestures or other actions can achieve a same end result, although the process of the interaction may be different. For example, swiping a finger and rotating the phone are two distinct interactions. Yet, both interactions achieve a same end result.

11 Claims, 7 Drawing Sheets

METHOD AND SYSTEM FOR SPEED AND DIRECTIONAL CONTROL OF RESPONSIVE FRAME OR ASSET

This application claims the benefit of U.S. Provisional Patent Application No. 62/090,830, entitled "METHOD AND PROCESS FOR SPEED AND DIRECTIONAL CONTROL OF RESPONSIVE FRAME AND/OR ASSET", which was filed on Dec. 11, 2014, which is incorporated by reference herein in its entirety.

BACKGROUND

As mobile devices have become ubiquitous, even globally, an individual who has access to a mobile device becomes very comfortable with the navigation of the device's functionality and applications. Presently, any individual with a mobile device expects to consume, share and experience content on the mobile device.

DETAILED DESCRIPTION

New ways, methods, and processes have emerged for individuals to consume, share and experience content on mobile devices. The technique introduced here pertains to the field of the mobile consumption of content, and the specific process and methods that permit an individual to interact and engage with content. Aspects of photography, video, audio, and the apparatus, methods and processes that create or capture these elements have continued to improve technologically, creating an opportunity for new methods of interaction with content. Through this process, a user interacts by way of gesture or action, controlling the speed and directional movement of a collection of frames and/or other assets (which together may form content). Entirely responsive to the interaction of the user, the result of the technique introduced here permits a user's control of the speed and directional movement over content. In this way, through the interaction of a user, content can be consumed with greater accuracy and finer detail.

Based on the interaction of the user, the technique introduced here interprets, analyzes, and identifies the speed and directional movement based on the input of the user. This permits a user the direct control of the frames and/or other assets by way of gesture or other action. In essence, these frames and assets, which collectively form content, are independently controlled by the user and are responsive to the interaction of the user, through their intended gesture or other action. A gesture and/or other action of a user is the basis of an interaction with a mobile device. A variety of gestures and/or other actions can achieve a same end result, although the process of the interaction may be different. For example, swiping a finger and rotating the phone are two separate, distinct, and completely different interactions. Both interactions however, although different, achieve a same end result. This end result is achieved after an interpretation process detects and analyzes the input of the user.

The technique introduced here applies to the ability of the user, by way of gesture or action, to control the speed and directional movement of a collection of frames and/or other assets, that create a relevant form of content the user wishes to consume. The technique includes a way to capture and store this collection of frames and/or assets.

Figure 1:
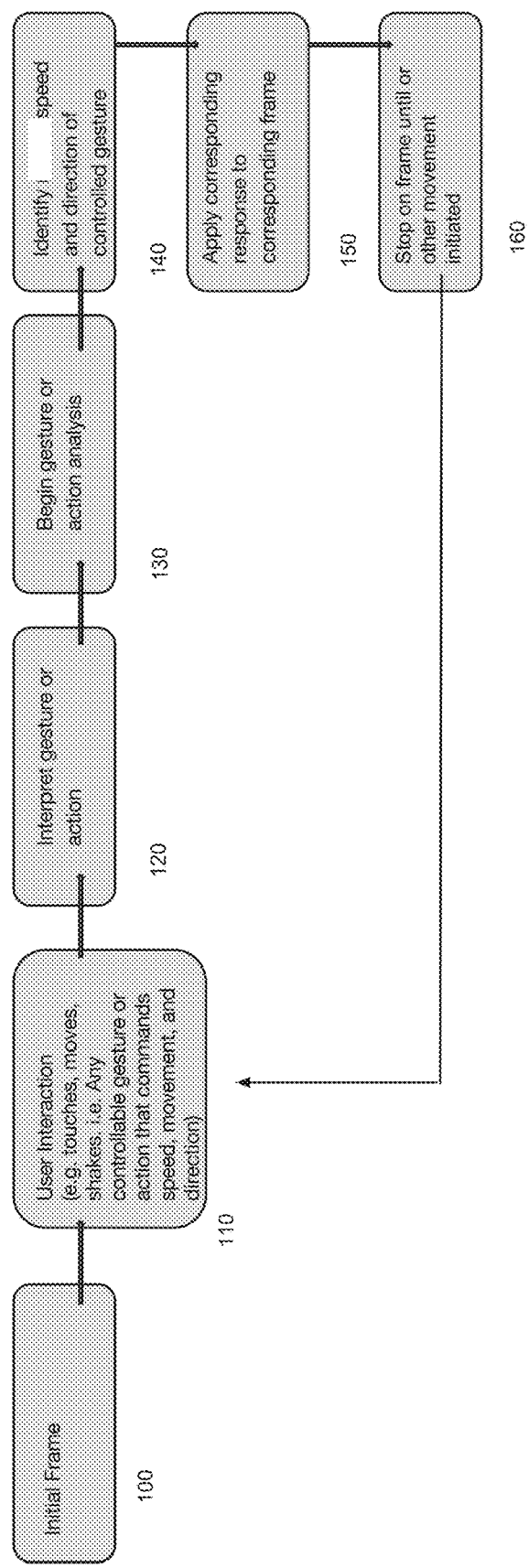
FIG. 1 is a flowchart illustrating the manipulation of speed and direction by a user controlling the consecutive frame and/or other asset.

FIG. 1 is a flowchart that illustrates the interaction and subsequent control of consecutive frame and/or other asset by the user through manipulation of speed and direction. A user is manipulating the process of how the frames are presented, controlling the speed and direction at which they control the speed, direction, and movement of a collection of frames and/or other assets.

At numeral 120, the process interprets the gesture of Numeral 110, as the technology understands the desired control of the speed and directional movement of the frames and/or other assets by the user. The speed at which the frames and/or other assets are encountered, viewed, rendered, or otherwise made noticeable through the controlled gestures of the user are determined by the interpretation of the gesture and subsequent procedural steps, as noted in FIG. 1. Likewise, the direction of the frames and/or other assets being encountered, viewed, rendered, or otherwise made noticeable through the controlled gestures of the user are interpreted at Numeral 120 in FIG. 1. A detailed explanation of the interpretation process can be found below in the description of FIG. 4 and FIG. 5.

A gesture analysis, as denoted by Numeral 130 in FIG. 1, identifies the desired speed and directional movement of the controlled gesture. The analysis will identify the speed at which the controlled gesture or action takes place. By way of example, if the intended gesture or action is interpreted at a relatively high speed, the collection of frames and/or other assets will move likewise at a relatively high speed. Conversely, if the gesture or action is interpreted at a relatively slow speed the frames and/or other assets will move likewise at a relatively low speed. The directional component will simultaneously be analyzed as a result of the interpretation of the gesture, as illustrated by Numerals 120 and 130 in FIG. 1. The directional component will be interpreted and analyzed giving a resulting identification of the desired direction of the user's input gesture or action. As well, a detailed explanation of the analysis process can be found below in the description of FIG. 4 and FIG. 5.

After the identification of the speed and direction of the controlled gesture on each frame, as depicted by Numeral 140, such values are applied to the corresponding frame, as depicted by Numeral 150. The result is a real-time reaction to the way input of the user, controlling the way in which the collection of frames and/or other assets are encountered by the user.

The process of the technique introduced here ensures that any gesture or action by the user reflects the speed and directional movement desired by the user. By way of example, the user may move their finger at any speed and in a direction they may desire thus resulting in direct and instantaneous display of frames and/or other assets that corresponds directly to the speed and direction they desire, ultimately creating a response that reflects the interaction of the user with the device.

Responding directly to the interaction of the user, a stop in action or gesture such, for example a swipe, will likewise trigger a stop in the process. The stop will result in a stop on the frame and/or other asset corresponding to the frame and/or other asset at which the user interaction stopped.

As shown in Numeral 160 of FIG. 1, if the user halts, stops, or otherwise creates a gap in the movement or direction of the consecutive frames and/or other assets, the frames and/or other assets will likewise reflect the break or pause. The cause of the break or pause in gesture or action upon the process will ultimately result in an equal and coinciding break or pause of the speed and directional movement of the frames and/or other assets. This reflects the immediate and direct control of the user through interactions, by way of gesture or action, upon the speed and direction of the collection of frames and/or other assets. The frame and/or other asset will break or pause based on the desired interaction, or lack thereof, by the user, through gesture or action. The speed and directional movement of the frame and/or other asset will again be controlled by the user once an interaction, through gesture or action, is detected. Once an interaction is again understood, the process will again return to the interpretation of the gesture or action, an analysis of the gesture or action, and a consequent identification of the desired speed and directional movement at the behest of the user and their resultant interaction. The frame and/or other assets will not be engaged until this interaction is again initiated. If an interaction remains unsought, the user may remain on the present frame and/or other asset they are consuming. If an interaction is intended, the technique will resume, resulting in continued responsive control of the speed and directional movement through the input of the user. Any combination of stopping and continuing will ultimately reflect the intention of the user.

The technique introduced here allows any combination of control, of the speed and directional movement, and, of stopping the consumption of a frame, that ultimately creates an immediate, direct, and responsive reaction that reflects the desire of the user for the frames and/or other assets consumed. By way of example, a user can control the speed and direction of frames and/or other assets at a fast rate but may stop instantaneously, creating a resulting instantaneous stop or break on the desired frame and/or other asset. The frame and/or other assets will continue this break in speed and direction until an additional interaction occurs. Once this action occurs, the process of the technique introduced here will infinitely continue if so desired by the user. This is shown in FIG. 1, detailed with an arrow looping the process, between Numerals 160 and 110, if so desired by the user.

The speed and directional components act as independent identifiers but rely consequently on the identification of each respectively. By way of example, if a user moves a finger to the right, a direction is independently identified. The direction, however, is meaningless without a corresponding speed, the rate at which the user is moving their finger. The speed of the collection of frames and/or other assets is tied to the directional interaction of the user. The speed of the gesture or action often is not useful unless given a likewise direction. Conversely, the direction of the intended gesture or action will not be useful without the desired speed or rate at which the collection of frames and/or other assets is viewed. Therefore, in most cases, the speed and direction of an intended gesture or action, although each cataloged as independent identifiers, are combined.

The speed and direction parameters are calculated independently of one another, but work together to create a simultaneous control over the speed and direction of the frames and/or other assets. The end result is the user being able to control the speed and direction of the movement of a collection of frames and/or other assets, thus allowing the user to consume these frames and/or other assets at a pace and course they desire.

The technique introduced here is active and can occur in fractions of seconds. It should be understood that the process illustrated in the diagrams may commence very rapidly or likewise very slowly in response to the interaction of the user. By way of example, if the user moves their finger slowly the interaction is slow, as a result the frames will move slowly as well. Likewise, if the interaction is fast, the frames will move in a responsive and fast manner as well. Regardless of the inputted speed at which the frames move, there is no lapse in how accurately the process interprets and responds to the input of the user.

The result of the interaction, i.e. the way in which the speed and the direction of the frames and/or other assets are presented, are only affected by the input interaction of the user. The control over the independent identifiers permit a user to control frames and/or other assets in a manner they may so desire. The user has direct control over these identifiers, meaning they are able control the speed and direction of the collection of frames and/or assets with their interaction or gesture. While speed and direction are example identifiers used in this discussion, the technique can use other identifiers. For example, location of finger on device display, length of time a finger is touching an area on the device display, and so on.

Speed is considered the controllable flow by which a collection of frames and/or other assets are consumed. Acting as an independent identifier in the process, the speed adjusts accordingly to the input value of the user, functioning responsively to their gesture or action. The speed is determined through an identification of how quickly the user is interacting with the frames and/or assets. That is, the speed is determined by the rate at which the next frame is responsively triggered. The speed adjusts accordingly to the intention, meaning a user can move very quickly with an interaction and the frames will follow accordingly. Likewise, a user can move very slowly and the frames will follow accordingly, acting very slowly. The input, produced by the interaction of the user by way of gesture or action, initiates the process which creates a subsequent interpretation, analysis, and identification that yields speed as an independent identifier.

Related to the speed is the direction by which the frames and/or other assets move. For the purposes of the technique introduced here, the term of direction, shall be understood to include course or route for the collection of frames and/or other assets to flow or move through the interaction of the user by way of gesture or action. The direction of the intended action or gesture will correspond, as it may motion accordingly, to the flow of frames and/or other assets.

The directional movement is determined and classified as an independent identifier in the process. Through this process, the gesture or action of a user is interpreted, analyzed, and then identified creating direction as an independent identifier. This determines the intended direction of the frames and/or other assets to move or flow responsively to the interaction of the user by way of gesture or action. The directional movement of the frames and/or other assets acts in direct correlation with the speed, noted as one independent identifier. The identifiers, although independent in the process, together assist in the proper result yielded or produced by the technique introduced here in accordance with the interaction of the user. The direction can be determined with an X and Y value. If a user moves toward the right direction along the X axis, the frames and or assets will move likewise to the right direction.

The ability of the user to control the speed and directional movement, permits ultimate and authoritative control over the collection of frames and/or other assets by the user. The technique can be implemented by a computing device, for example a hand-held mobile device.

The Controllable Speed and Directional Movement of a Collection of Frames and or Other Assets A frame is considered, for the technique introduced here, as a snapshot, still, piece, element or likewise factor of a product that together creates the makeup that comprises the content as a whole. Considered for the purposes of the technique introduced here, a 'frame' represents the makeup, build up, or pieces of a larger collection that forms content. A number of individual frames together forms a collection, i.e., a collective form of consumable content presented to the user.

The responsiveness of the technique mimics the interaction of the user by permitting the user to control the speed and directional movement by way of gesture or action over a collection of frames and/or other assets. Consider, for example, that a frame is an image, picture, or still captured. By way of example, imagine a collection of ten frames, or ten individual images, pictures, or stills captured, that through the process of the technique introduced here, permit a user to control the speed and directional movement of the consumption of each of the ten individual frames. The user is thus granted the ability, through the process of the technique introduced here, to control the speed and directional movement of an individual snapshot, still, piece, element, particle or likewise factor of a product that creates the makeup, buildup of, or pieces of a wholly consumable collection of frames and/or other assets.

An asset is considered any media element (including audio), program, file, system or process of order, data, or information that together forms a collection. A frame may include an asset, an asset may include a frame and they both can be presented together. An asset and a frame, however, are two separate elements that comprise content and need not necessarily be together. For example audio or sound, an asset, may accompany a burst of photographs, or a collection of frames. Together, this sound and photographs form content. Similar to a collection of frames, the process of the technique introduced here permits a user to control the speed and directional movement of the assets, thereby controlling the consumption of the assets. When a user controls, by way of gesture or action, the speed and directional movement of the consumption of the asset, they are similarly controlling the snapshot, still, piece, element, particle or likewise factor of each individual asset, which together, comprises a larger collection of assets. By way of example, consider a collection of frames that has audio or sound attached. A user is permitted to control the speed and direction of the audio or sound and the frames that act jointly together. Therefore, it is through the process that a user can control the speed and directional movement of the frames and or the associated assets. When a user directly interacts through gesture or action with an asset and the frame directly associated, the speed and directional movement is responsive to the intent of the user, effectively allowing them to control the consumption of the frame and or the associated asset through their interaction.

When an asset is tied to a frame, the frame and asset move in coordination to the input of the user's interaction, acting dependently on each other. On the other hand, an asset may be independent of a frame, meaning in certain circumstances, assets may not respond to the direct control of a specific collection of frames a user is interacting with, and vice versa. For example, an audio file, may in certain circumstances, continue to play regardless of the interaction of a user with the collection of frames. When both are not tied together, the frame and asset act as two separate operators and will not respond together to the input of the user. In this example, the frames may respond to the input of the user, but the audio may not. In this case, the frame and asset will act independent of each other.

Content can come in many different forms. The terminology should be understood that a frame may be associated with an asset or it may not. Likewise it should be understood that an asset may be associated with a frame or not. Both can act independently and not have an effect on the process. For example, while content may be frames and assets, content may also only be a collection of frames with no assets, or vice versa. An asset independent of a frame, like a frame independent of an asset, still embody the characteristics of the technique introduced here, and are still controllable by way of gesture or action.

Controlling Speed and Direction of a Consecutive Burst of Frames

In the past, photographers and other users could capture a collection or "burst" of photographs in quick or rapid succession, but had no way of engaging with them collectively at the same time or as a whole. As a result, a photographer could only select the single, best image from a group of images. The technique now creates a process that allows for a photographer or user to capture and consume a collection or burst of photographs together. Through the process presented, a user is granted simultaneous control over the speed and direction at which they consume, view, or interact with the burst of photographs on a mobile device, through interaction by way of gesture or action.

The process details a method that grants the ability of a user to capture a consecutive burst of frames or photographs. These consecutive frames or photographs are captured utilizing the "burst mode" function or any similar method known now or later developed that through any manner allows an individual to capture a collection of simultaneous frames and/or other assets, especially photographs, that capture and appear in consecutive order over a designated period of time. The process of the technique assures a unique interaction with "burst mode" by allowing a user direct and responsive control, by way of gesture or action through a device, over the speed and directional movement of a collection of frames or burst of photographs. The technique is brought to life through the interaction of a user and the direct correlation to the capture process of the burst mode function.

A user through the process of the technique, controls the speed and directional movement of the collection of frames or the burst of photographs through interaction by way of gesture or action. This interaction creates a burst of photographs that are controllable wholly by the interaction of the user through the consumption rate. The consumption rate is the rate at which a user views, analyzes, or consumes the collection or burst of photographs. A response is determined by interaction with a device by a user, who controls the speed and direction of the collection or burst of simultaneous photographs. In direct coordination with the capture of a burst of photographs, the shutter speed is controlled by the user, allowing a user to select or choose the rate at which a photo is to be taken in consecutive or successive order over time. The shutter speed is considered, as the length of time the shutter of a camera is open when taking a photograph. The slower the shutter speed, the longer the exposure time. In coordination with processes of many devices separate of the process of the technique presented, the shutter speed interacts together with the aperture, to control the total amount of light reaching the sensor. The process of the technique pertains to any process or similar method that produces a result allowing a user to adjust the shutter speed duration in conjunction with a burst of successive photographs. The technique records a video and then responsively pulls an individual frame, still, or photograph based on the shutter speed indicated by the user. Although acting differently compared to the shutter of a conventional camera, this mobile process yields an equal result allowing a user total control over the shutter speed at which a photograph is taken.

By granting control over the duration of the shutter speed, a user can control the duration between frames, giving control to the user over the frequency and duration of frames captured. By way of example, adjusting the shutter speed to either one (1) second will, through the process of the technique, capture a photograph every one second until the duration of the capture process is exhausted, terminated or paused according to user input. There is no limit or minimum to the number of photographs taken. Conversely, adjusting the shutter speed to ten (10) seconds or to one-tenth of one second (0.1) a frame will be captured every ten seconds or one-tenth of a second respectively. By way of example, imagine a user capturing a scene of an individual jumping off of a dock into a lake. The user selects the shutter speed to capture every 1 second. As the scene unfolds, the user captures, using the burst mode, a frame or photograph every one second. In the example, the technique will capture a photograph every one second, showing the individual on the dock, in the air, and into the water. It should also be noted that the shutter speed will have a drastic role and impact on the final method or end result presented. If the duration between shutter speed is longer, changes may appear more obvious while a shorter duration between each frame captured may yield a more discrete change between photographs.

A user is enabled to set a desired shutter speed which will directly correspond to the capture process of the technique presented. By controlling the shutter speed, a user has control over the input parameters of the capture process. For this reason, the shutter speed, directly related to the capture process, affects the final output result. The capture process is affected by any parameters indicated by the user including the shutter speed, and other known elements of photography, e.g. light. The frames are then compiled together forming a burst, or collection of multiple photographs together, that through the process of the technique act in direct response to the interaction of a user, granting full control over the speed and direction of the consumption rate of the burst of photos.

A user can automatically or manually take the burst of photographs. If manually captured, a user controls the parameters as to which frames are captured, meaning the process will respond to the input parameters of the user in the capture process. These parameters include shutter speed, number of photos captured, and time at which the process begins to captures. If manually captured, the process will likewise respond to the input parameters but will commence the capture process in a direct response to the interaction of the user in beginning and ending the process to capture. Manually, a user needs an input interaction, which for example, could be the pressure of a finger. Once their finger or input interaction is recognized, the capture process begins and will stop when the user ends their input interaction, i.e. releasing their finger. Having these separate ways to capture, gives more options to users, as different circumstances may warrant different ways to capture.

The method for viewing and capturing a collection or burst of photographs is also unique. In the method of the technique there exist two distinct processes that captures the entire width and height of the mobile device used, creating an immersive quality as an end result. By capturing the use of the entire screen of the input device, essentially generating a "full screen" component, the method of the technique permits users to capture and experience a burst of frames or photographs to a greater extent of detail. The method for capturing and consuming a burst of frames or photographs is brought to life by covering, maintaining, or filling all or nearly all of the full height and full width of the available screen of a mobile device. The result immerses an individual in the consumption of the content, creating a greater degree of experience, detail, and information made available to a user that may otherwise be hidden or not obvious if consumed through a smaller percentage of the screen. This action can operate either horizontally or vertically, but is described throughout for the purposes of an explanation, as horizontally. The immersive experience created is central to the experience of the user. The end result that is created by capturing with and then through using the entire height and width, or close approximation thereof, for a screen on a mobile device, grants a photographer or user a greater opportunity to experience and interact with a collection of frames or burst of photographs in successive order. Utilizing the full width and height of the device, the collection of frames is controlled and subsequently consumed by the user at a full height and width available. The process of the technique presented enables a capture and consumption of consecutive frames and/or assets using the full width and height of the screen provided and in combination critical to the end result.

The camera likewise captures the entire width and height of the mobile device, which is connected to the burst function, ultimately allowing a user a simple and immersive burst mode capture process. Due to the larger screen, a user is given a better opportunity to capture a series of frames that may contain minuscule detail. By way of example, if a user captures a scene of trees with their leaves blowing in the wind, a fully immersive screen allows a photographer or user to see the subtle nuances with the largest screen possible of the device being used. By capturing a number of successive photographs, the capture process establishes the ability of the end result to function most effectively, creating an immersive experience for the user utilizing the full height and width of the burst mode function.

The immersive experience produced is central to the user and is made possible through the capture process, notably the capture of an image in a burst of consecutive photographs that are captured in successive order. The immersive nature of the final product of the technique is made possible through the immersive condition of the capture process. Although both act as separate processes, the ability to capture and the end result produced, both use the entire screen of the mobile device. Capturing a burst or collection of successive frames is done so through utilizing the entirety of the full height and width available of the screen on a mobile device, which permits a greater scope upon the end result produced by the technique. The capture and end result of the technique are tied directly to the ability of a user to capture a burst or collection of successive frames. The interaction with the captured burst or collection of successive frames are ultimately determined by the consumption rate, in combination with the parameters determined by the user, notably the shutter speed, and likewise through the immersive nature of capturing the full width and height of the screen available, all achieved through the interaction with the a burst mode function, which together form and complete the product yielded by the process of the technique.

Figure 2:
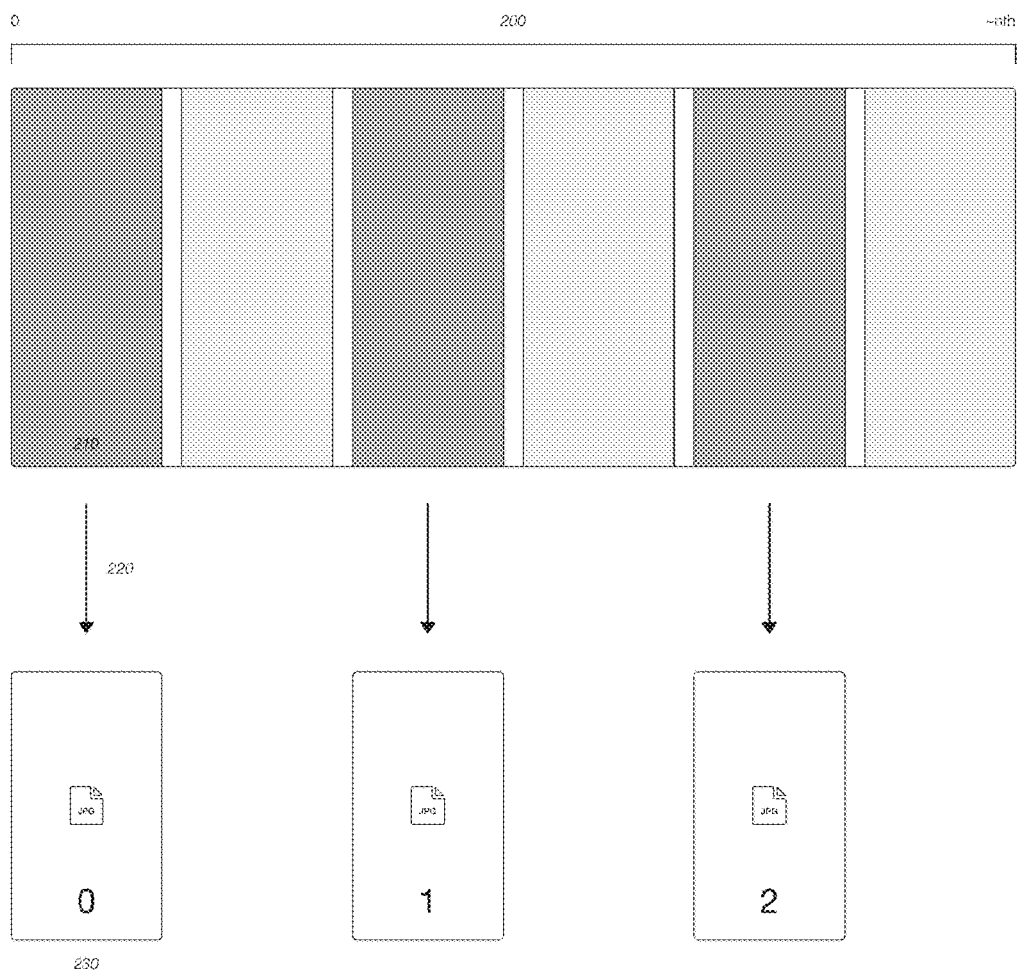
FIG. 2 is a schematic diagram demonstrating an example of the procedure for the camera capture process and the successive formation or compilation of a collection of consecutive frames and/or other assets.

FIG. 2 demonstrates an example of the procedure for the camera capture process and the successive formation of a collection of consecutive frames and/or other assets. The process captures a stream of consecutive frames, which through input parameters at the control of the user, pulls a desired frame from the stream and adds the pulled frame to a collection of frames organized in a sequence, for example chronologically, of capture. Other sequences can be defined, as well, such as a user-defined sequence where a user selects the sequence in which they want the frames displayed. Another example is a randomly generated sequence, for example, for amusement of the viewer. FIG. 2 illustrates a stream of consecutive frames, captured one after another, using the camera of a mobile device. The process captures, in a method similar to a video, the full height and width of multiple consecutive frames, continuously running until stopped, halted, or paused by the user. The process pulls or grabs a desired frame according to the input parameters of the user. The technique permits a user to adjust, control, or manipulate the parameters of the process creating an end result that pulls the desired frame from the stream based on user input. This method allows the user to have control, captured simultaneously or not, over the number of frames to be pulled and the frequency at which frames are pulled. Once each frame is pulled, the frames are ordered chronologically in which they were captured, forming a collection of consecutive frames. The collection then can be controlled by a user controlling the speed and direction of the display of the collection of pulled frames.

Referring to FIG. 2, numeral 200 depicts the stream of consecutive frames, 0-n, being captured utilizing the full width and height of the device available. The first frame captured is Frame 0, followed by Frame 1, then Frame 2, and so on continuously until the capture process is stopped, paused, or otherwise halted by the user.

Numeral 210 represents a single frame in the stream of frames captured. In this example, every other frame is captured and is pulled from the stream, depicted for the purposes of the present example as a darker shaded rectangle. The identification of each of these three frames corresponds to the parameters of the user. The alternating pattern, shown here only for the purposes of an example, continues until the process is indicated to stop by the user.

Numeral 220 illustrates the pulling of each frame from the stream. These frames are pulled, and may or may not be stored, in the order that they are captured.

Numeral 230 represents the ordering of the frames captured from the stream, forming a collection of consecutive frames.

Figure 3A:
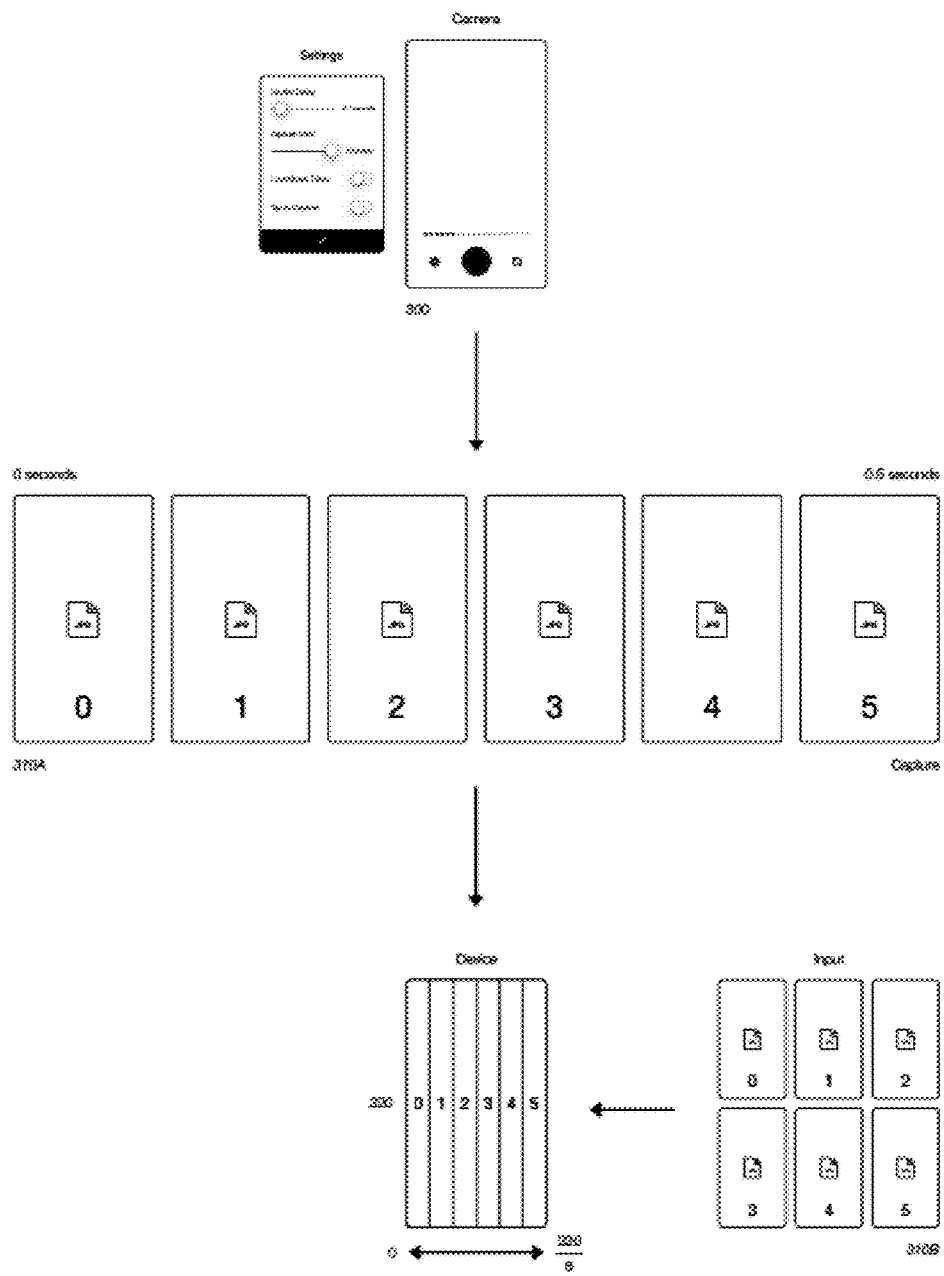
FIGS. 3A and 3B illustrate a single process of capturing and storing a collection of frames.
Figure 3B:
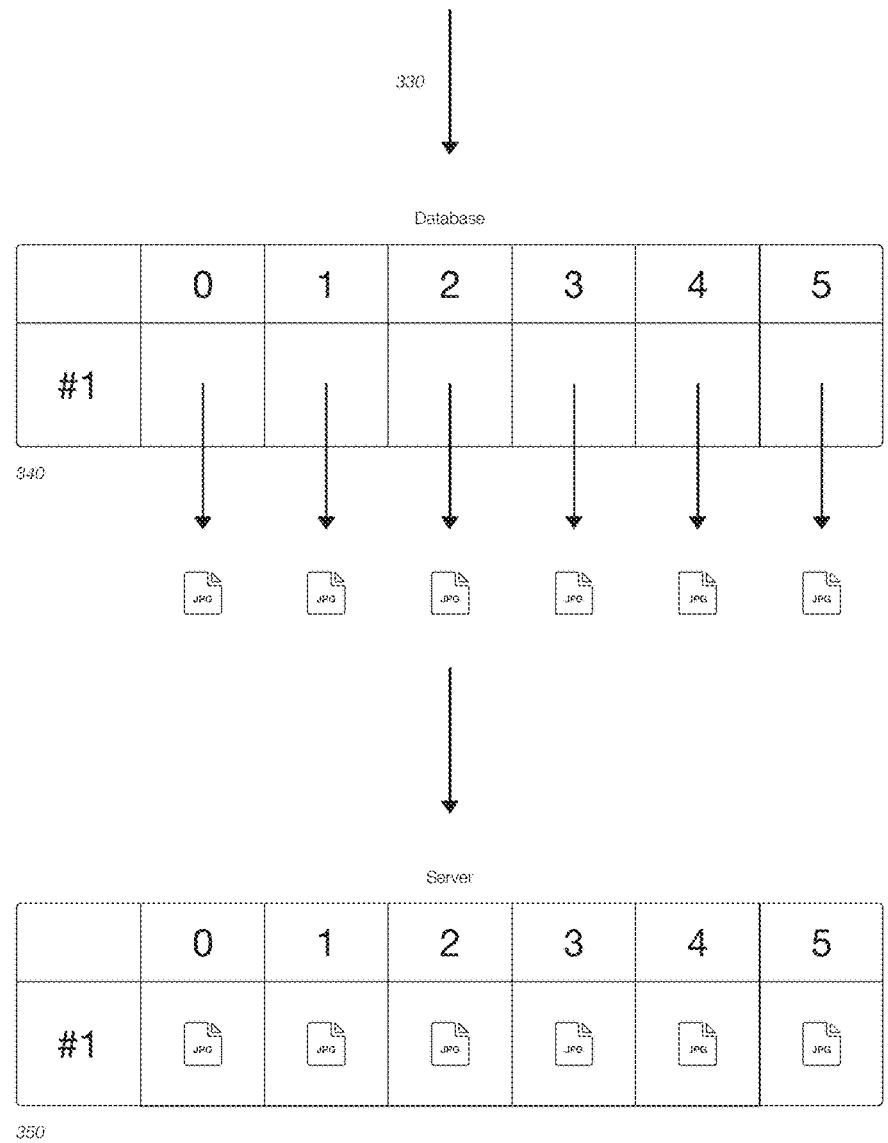

FIGS. 3A and 3B refer to a process of capturing and storing a collection of frames. A user can set parameters to control the capturing of a collection of photos, such as shutter delay and capture limit and can also manually or automatically capture a collections of frames and or assets. For example, a user can automatically capture a burst of photographs via a countdown timer that once begins a countdown, captures the burst of photos responding the input parameters of the user. If a user sets frames to be captured every half second, the process, although set to manually capture still adheres to the input parameters of the user. These parameters affect the stream of frames, including which frames are selected, which consequently affects how a collection is formed, as depicted in FIG. 2.

Numeral 310A portrays the formation of frames pulled from the stream. This formation is chronological by which it was captured, forming what is considered an array. The time illustrated represents, for the purposes of an example, that 6 frames (each 0-5) were captured over a period of 0.5 seconds. These frames are stored, in this example, as a .JPG. These frames are captured, pulled, stored in a file format and then assembled in chronological order creating a collection of frames desired by the user. If a user is unhappy with their collection, the process resets and returns to numeral 300.

Numeral 310B demonstrates the input process whereby a user inputs, rather than captures, a collection of frames and or assets. Compared to the capture process, the input process is a separate and distinct way for a user to upload a collection of frames and or assets directly to the server. With the input process, a user will omit the capture process and all elements related to this process entirely, including input parameters. Note that output parameters will still have an application. By omitting the capture process illustrated in FIG. 2 and numeral 300 and 310A, the input process begins at numeral 310B. All elements after 310B, including the packaging of the inputted collection of frames and or assets denoted by numeral 320, will continue to apply and have the same impact, effect, and outcome on the end result as a collection that was uploaded through the capture process. The gallery or camera roll, will also remain useable by a user who inputted a collection in the same way it operates for a user who captured a collection. Although starting at a different point in the process, the final inputted collection presented to a user will follow the same process and method creating the same end result that may be shared via the social networking system on the service. In the same way of a captured collection, an inputted collection of frames and or assets may be shared publicly or privately by a user. Therefore, all processes and elements beginning and after numeral 320, will operate in the same manner regardless of the frames being captured or inputted, and will ultimately have the same end result with no distinction between the presentation of a captured or inputted collection of frames.

Numeral 320 refers to the temporary storing of the array and a traversing method created on the device. A traversing unit or method is created by taking the width of a desired screen space and dividing by the number of frames in the collection, resulting in an equal space for each individual frame. The width of the screen space may be determined by the entire width available or a smaller percentage of consecutive screen space. For the purposes of an explanation, the entire width of the screen was used, by taking the available device width and dividing by the number of frames pulled from the capture process. In this example, 320 pixels (the width of the device) is divided by 6 (the number of frames pulled, 0-5). The result of this method creates an evenly divided screen granting an equally allotted division or proportion of screen space for each frame. In this example, the screen is evenly divided into 6 rectangles, each rectangle representing an individual frame, marked by 0-5, respectively. Each frame, once traversed through by gesture or action of the user, calls the adjacent frame. The consumption rate at which that adjacent frame is called is based on the speed and directional movement of the input of a user.

Therefore, the rate at which each frame appears and the direction by which they move are based entirely upon the interaction of the user.

Referring to FIG. 3B, numeral 330 represents the bundle uploading process by which the individually captured frames upload to the server together as a bundle. Once captured by the user, a collection of frames and or assets is bundled together, then triggered to upload to the server, once initiated by a user, where it will store for a period of time. Instead of uploading each individual frame in the collection of frames created by the user, the technique bundles each frame in the collection of frames captured first on the device of a user and then uploads them together, as a bundle, to the server. The result of this technique creates a faster and more efficient uploading time that grants a user a more precise and responsive control over the frames and or assets captured by a user. Similarly in the downloading process, the technique downloads from the server to the device likewise as a bundle, via the temporary use of the database, where once on the device the frames and or assets are unbundled. This method yields a similar benefit to the user of improved uploading and downloading speed and performance. Ultimately this benefits the user with a greater control over the speed and direction of the collection of frames and or assets, as depicted and illustrated in FIG. 4.

Numeral 340 illustrates the temporary storing of the collection of frames and other assets associated with the frames. A database on the device references the collection but does not store the collection, acting instead as a linking device with a knowledge of the location of the collection, that once transferred, is stored on a server, as indicated by numeral 350. When a collection of frames is sent from the database to the server, the server stores the collection for a period of time. When the database references the collection on the server, the collection is sent to the mobile device by the server.

Numeral 300 references the process of capture and setting the parameters for capture.

Numeral 310A references an array created by the frames pulled in order of their assembly. If a user is unhappy with their collection, the process can return to numeral 300. Numeral 310B refers to the input process of a collection of frames and or assets that were captured using a separate device.

Numeral 320 references the division of the screen of the device available, by taking the width of a desired screen space and dividing by the number of frames pulled from the stream. Each frame has an equal amount of space that once traversed by the interaction of a user, calls the movement of the adjacent frame. The rate at which each frame appears and the direction by which they move are based upon the interaction of the user.

Numeral 330 illustrates the unique bundle uploading process. This technique forms the individually captured frames into a bundle that are then uploaded to the server. Once in the server, they are then unbundled in the downloading process before appearing on a device, as described in FIG. 4.

At numeral 340, the technique references the temporary collection of frames captured from the stream in the order by which they were taken. The collection, however, is not stored at numeral 330. The database, therefore, references but does not store the collection of frames.

Numeral 350 depicts the server. When a collection of frames is sent from the database, the server stores the collection for a period of time, which when referenced from the database, moves to the mobile device.

Figure 4:
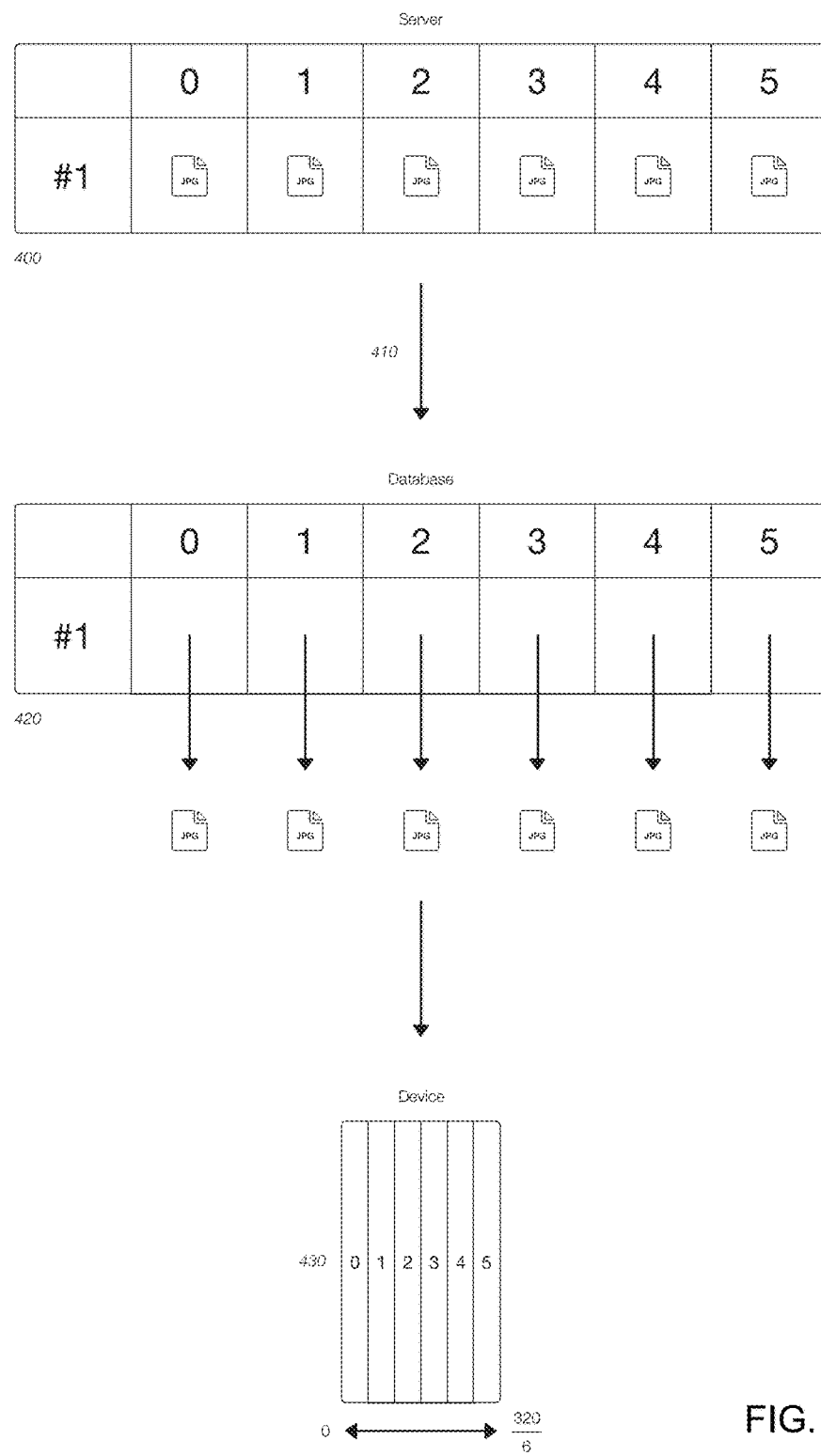
FIG. 4 illustrates the downloading process from the server to the device, by way of the database.

FIG. 4 illustrates the downloading process from the server to the device, by way of the database. Numeral 400 represents the server where the collection of frames are stored, i.e., uploaded to the server from the device via the database as a bundle, as illustrated in FIGS. 3A and 3B. FIG. 4 represents the reverse process of FIG. 3, whereas instead of uploading the collection of frames, the process allows a user to download the collection of frames to their device. Numeral 400 depicts the storage of the collection of frames as a file, set in order by which they were captured, e.g., according to the process illustrated in FIG. 2. Numeral 420 references the database that recognizes the location of the desired frames being stored within the server. The database retrieves the collection of frames from the server as a bundle and temporarily downloads and holds the collection until transferred and unbundled to the device. Each collection is given a unique identifier that is used throughout the process. Once the collection is identified by the database within the server, the collection is temporarily stored within the database and is then transferred to the device unbundled. Once transferred from the database to the device, the collection of frames is fully controllable by the user.

Numeral 410 depicts a unique bundling aspect of the downloading process illustrated in FIG. 4. Numeral 410 illustrates the process by which a collection of individual frames is packaged together and downloaded to a mobile device forming, in the process, a bundle. Although each frame is captured independently, the process provides a bundle technique associated with the collection or burst of frames and/or assets which uploads or downloads each individual frame in a collection of frames as a bundle, as opposed to a traditional method of uploading or downloading each independently.

Each frame is captured or inputted independently, bundled together on the device and then uploaded to the server as a bundle illustrated and detailed in the adjoining explanation of FIGS. 3A and 3B. Before being uploaded to the server, each individual frame is bundled, accumulated, or assembled together forming a package, which is then retrieved from the server via the database in the downloading process, as illustrated in numeral 420. Once the bundle is downloaded to the device, the collection of frames comprising the bundle now become unbundled.

As depicted with numeral 410 in FIG. 4, the process takes the individual frames captured by a user, which were bundled together on the device, and then uploads this bundle or series of bundles to the server. Once the bundle is taken from the server, the frames are unbundled once reaching the device of the user, as depicted in numerals 420 and 430. The user interacts with the unbundled frames and or assets on the screen of their device. The result produces a faster and more efficient uploading and downloading speed, as the frames download and respond faster, which ultimately grants a user a greater, more responsive, and detailed control over the speed and direction of the collection of frames and or assets. Compared to a traditional method of downloading each captured frame individually, the technique introduced here uses a bundle technique to take each frame captured independent of one another, upload and download each frame together, completely as a whole, forming a bundle.

Once the bundle is taken from the server, the frames are unbundled once reaching the device of the user, as depicted in numerals 420 and 430. The user interacts with the unbundled frames and or assets on the screen of their device. The bundling and unbundling processes, as described and illustrated in FIGS. 3A, 3B, and 4, apply to the effectiveness of the uploading and downloading technique of the present technique. The result produces a faster uploading and downloading process for the user.

Any combination in the number of frames and or assets being bundled or unbundled, which may be implemented for aesthetic purposes, will have no effect on the uploading and downloading processes. For example, in a collection of ten photographs they may be bundled completely together on the uploading process, but may be separately unbundled on the downloading process. In this example, while ten frames were uploaded and bundled together, a single frame may first be downloaded and a bundle of 9 would subsequently follow. This difference in the way each is uploaded and downloaded, will have no effect on the end result experienced by the user, only impacting the method of presentation. The frames, in this example, although bundled and unbundled in a different sequence, has no effect as the final result remains a collection of ten frames. The way in which they processed on the backend is the only difference. There may be any combination, or no combination at all, in the number or sequence of the frames bundled or unbundled in the uploading or downloading process. This may be used for aesthetic purposes, in the example, providing a user with an initial frame immediately while the remaining frames unbundle. Regardless of the combination of frames uploading and downloading, it will have no effect on the final result of the product interacted with by the user.

Numeral 400 depicts the process recognizing the server where the collection of frames is stored. The uploading process of the collection of frames to the server is described in FIG. 3.

Numeral 410 illustrates the process by which the individual frames, although captured individually, are downloaded as a bundle, and then unbundled before reaching the device of a user, as opposed to downloading each frame independently. The collection of frames is likewise bundled together in the uploading process, once initiated by the user, as illustrated and described in FIGS. 3A and 3B.

Numeral 420 represents the retrieval of the collection of frames from the server and temporarily downloading and holding them at the database until transferred to the device.

Numeral 430 shows the end result of the downloading process of the collection of frames, initially from the server, temporarily to the database, and from the database to the device. The width of the device was divided equally by the number of frames that were unbundled, providing an equal traversing percentage.

Parameter Description

The frames and or assets, although captured chronologically, may be displayed in an order that is counter-chronological. For example, the frames and or assets are captured in chronological order. These frames, however, may be displayed to a user chronologically or not, depending on the preference of the user. This aids in the utility provided to the user. For the purposes of an example, a user may capture a golf athlete's swing. To better analyze the swing, the user may wish to have the frames presented to them in a counterclockwise way. In this example, a user may desire to interact with a collection of frames "backwards" or "forwards" meaning the frames and or assets may be presented in a way that is more beneficial to them. From the perspective of the device, the collection of frames and/or assets follow the same capture process as described, with the only difference being the way in which the collection is presented to the user. This presentation does not change the upload or downloading process and only impacts the collection once it has been downloaded to the device.

Defining input and output parameters. An input parameter is any action that has an effect, impact or impression on the result of the capture process. For example, an input parameter could be the rate at which frames are captured. An input parameter of 1 second, for example, will capture a photograph every one second. An output parameter is any effect on the end result outside of the capture process.

For example, a filter that displays a better more aesthetically desirable collection is applied after the captured collection is downloaded to the device but before the final result is shared publically. Accordingly, the input parameters will affect the capture process of the frames and/or assets, while output parameters will affect the way the collection is presented to the user. Both parameters are similar in the sense that they impact the output or result presented to the user. Both are likewise similar in that they respond directly to the input of a user. Parameters can be changed or applied based on the intention of the user. Likewise, graphical display components grant a user the ability to select and choose which input and output parameters they want on their final result. The distinction lies between input, which alters the capture process, and output, which impacts the presentation of the result to the user. From a systems perspective, both types of parameters will affect the end result but both act and distinctly different points in the process, one in the capture process and the other in the presentation process.

By giving a user the freedom to engage with and use parameters in the method they desire, the process helps to create a more desirable end result for a user. Input parameters can also include the photography elements now known or later developed on mobile devices that help to improve the capture process of the camera itself. Output parameters may also reflect improved aspects of camera presentation, including effects, filters, and other forms of aesthetic presentation. In either scenario of the parameter, the effect will achieve the same end result in that either the capture (input parameter) or presentation (output parameter) parameters, continue to play the same role in the overall process.

Camera Roll

The capture process includes a method for storing one or more collections of frames and or assets without being uploaded to the server. This method creates a way for users to store and access captured or inputted content. The display method is similar to a 'camera roll' where a user has a gallery of one or more frames and or assets, which they can access. This gallery benefits the user as a service connection is needed to upload and download the collection of frames and or assets to and from the server. The service connection is required to make the transfer between the system and the device, and without this connection, the content may be lost or misplaced. The gallery acts as a storage point to ensure that the content is not lost and may still be uploaded to the system. For the purposes of an illustration, the gallery acts as a queue that stores the data and metadata for each collection of frames and or assets. This queue is ordered sequentially, and the service will upload each stored collection in the queue once both a service connection is restored and an upload is prompted by the user. This gallery, compromising of one or more collections of frames and or assets, will remain until each collection is prompted to be uploaded to the server by the user. If it is uploaded to the server from the gallery, each collection will then be shared on the social networking system either privately or publically.

Uploading Directly

A method additionally exists where a user can upload a separately captured collection of frames and or assets onto the service. This method is considered, for the purposes of a description, as an input method wherein a user will transfer previously captured or recorded content from a separate service or device and transfer those frames or assets to the system. From a systems perspective, the addition of imputed frames affect only the capture process, and does not affect the uploading or downloading process. This only alters the capture process, as the frames and or assets are essentially replacing the content that is otherwise captured on the service, as depicted in numeral 310B. As such, all other elements, including the process of bundling, uploading to the server, downloading and then unbundling, display, interaction, and social elements continue to apply.

From a system perspective, the user is inputting frames and or assets that they would otherwise be capturing. Therefore, the process begins at numeral 320, simply replacing the capture process with an input process. The input process is a method that a user may take to upload or transfer content from another device onto the service. The benefit to the user is the ability to capture content on another device yet still be able to claim the benefit in the presentation of the collection. For example, an individual may capture a burst of high quality photographs on a digital camera that has an ability to capture at a greater detail than a mobile device. This user can still, although capturing on a separate device, transfer their captured photographs to the method and system presented here. This user would be able to view their higher quality captured photographs in the same method, controlling the speed and direction at which they are presented. This further allows a user to capture content on a separate device, yet still view and control the speed and direction of the frames and or assets captured.

Social Networking Component

The ability to share a collection of frames and or assets with a plurality of users is an important element of the process introduced here. A social networking system comprises of a connected plurality of users that provides a platform for users to share a captured or inputted collection of frames and or assets with one another. The social networking system allows users to share the captured or inputted collection of frames and or assets with one another and present each collection in the same manner described throughout, in which a user has complete speed and directional control over the frames and or assets that are presented. A choice, however, exists for a user to share or not share their collection of frames and or assets with a plurality of users via the social networking system. The social networking system comprises of both 'public' and 'private' settings, in which a user has an ability to select the method with whom they share content. The choice is provided to the user, to either share their captured or inputted collection of frames and or assets publicly or privately. The ability to share is entirely up to the discretion of the user. If shared privately, the frames and or assets will not be shared or viewable to any other person or user on the system. Conversely, if shared publicly, the collection of frames and or assets will be shared and become viewable to other users. Publically sharing includes a number of methods and ways to share the frames and or assets, as users will be able to share through a method in which they choose. These sharing methods, once selected publically, include a way to share with all users on the social networking system; to share with a select group of users on the social networking system (those users are selected by the user who created the shareable content); and a method to share on other existing communication tools and platforms, including other social networking systems and other forms of communication, including email or text message, etc.

To further illustrate the methods of publically sharing on the social networking system, defined are two distinct and separate sets of users. One user is the user creating or inputting the content that they wish to share publically. This content creating user is the user who is sharing their created content with a plurality of users on the social networking system. The second user is the user who is receiving the captured or inputted collection of frames. This second user is therefore viewing, engaging, or interacting with the collection of frames and or assets that are shared with them. This second user, the sharing user, has the ability to re-share this content and promote it to other users.

Advertisement Platform

The described technique also pertains to any collection of frames and/or other assets that have the characteristics, intentions, or like behaviors of an advertisement. Specifically, the following pertains to an advertisement triggered by the control of the speed and directional movement of a collection of frames. An advertisement, paid or not, may refer to any method that prompts or otherwise promotes or incentivizes any idea, product, individual, or movement. The technique includes the process by which the collection is uploaded, stored, and downloaded to other devices acting specifically in conjunction with the monetization associated with an interaction of a user with a collection of frames and/or other assets. The platform may be referred to as an engagement system or social network that operates as an entity that captures, stores, and grants a user direct control over the speed and directional movement of a collection of frames and/or other assets that comprise an advertisement. The process is not limited by any form of payment or practice of advertising.

Advertisement Uploaded to Server

The collection of frames characterized as an advertisement follows a unique uploading process to the server. One option exists after content is created, uploaded temporarily but not stored to a database, sorted and then finally stored in a server until prompted to download to a device, demonstrated by FIGS. 3A and 3B and FIG. 4.

Another unique option, however, follows a route in which the collection of frames characterizing an advertisement is uploaded directly to a server, where it is stored, in a method similar to 310B. Such uploading is done at the request of a third-party or advertiser. The frames submitted to the platform by a third party or advertiser may be generated by the platform or are subsequently obtained by the platform. The platform then sorts and assembles the collection of frames, combining the submitted frames with additional frames, including those with text, that act as an outbounding link or promote any form of advertisement. Once this collection of frames is assembled in correlation to the request of the advertiser, the platform directly uploads the assembled collection of frames to the server, including those with text and any outbounding links that form any advertisement or promotion, effectively minimizing the contact period with the database. With this process, a user may select and move away from the platform to a third party via the outbounding link. The server, and any database associated with the process although limited in contact, will halt or stop all processes once a user is willingly removed from the platform of the technique.

Outbounding Links

The technique pertains to any consecutive frames and/or other assets which, whether captured or assembled consecutively, prompts a user to connect, join, or otherwise engage with an entity outside of the platform. This engagement is considered separate of the platform, creating a link, reference, channel, network, or any other system that directly or partially connects a user away from the existing platform with which they are interacting. The device routes the user away from the platform to a third party or entity that may have supplied the re-routing of the ad or the outbounding link. The process by which this occurs, from the perspective of the device, moves a user away from the platform into the link or connection of the third party, unassociated with the platform or the technique presented here. Once a user interacts with the outbounding system, the technique presented will not support or provide any connection from the platform to the third party. The platform provides the initial interaction the user has with the outbounding link, however after the connection is made, further processing is controlled by the third party. An advertisement may combine, merge, or form along with any collection of frames an outbounding link or any form of promotion that may be nested within the collection of frames and/or other assets.

Monetization

The technique can include a monetization process that is based on a user's interaction with a collection of frames and/or assets. The technique can be monetized through a method referred to as 'Pay Per Interaction.' With this method, an advertiser may do so based on a Pay Per Interaction basis. A Pay Per Interaction basis refers to an advertiser paying for the advertisement only if a user interacts with the advertisement. The metric by which the advertiser may use to recognize the interaction of the user may vary, but is often referred to as the traversing percentage, described in fuller detail below. The traversing percentage maintains that a user will have to engage with a percentage of the screen to result in an interaction, allowing an advertiser to subsequently pay for that interaction, thus creating the Pay Per Interaction model. A certain percentage of the screen must be traversed by the user in order to qualify. Other monetization methods include the prompting of a user to leave from the platform they are engaging with and re-route them to a third party link. The Pay Per Interaction model and other monetization methods are examples of monetization and other monetization models may result from the interaction a user has with a collection of frames and/or other assets.

Gamification

The gamification aspect of the technique refers to the characteristic of an advertisement that creates a call to action of the user, incentivizing them through a variety of options and methods creating a 'game' for the user. The incentivizing methods used by the gamification process, will generally include points or other incentivizing utility that a user may accumulate based upon completing achievements set forth by the third party or the platform itself. These achievements may include, for the purposes of an explanation, a percentage of the screen that must be interacted with, a specific number of times a collection of frames may need to be interacted with by a user, i.e., traversing a certain percentage of the screen more than a single instance or any other method that can be categorized and defined as an achievement for the user. The gamification element may lead to a greater degree of interaction by the user as a result of their interaction with a collection of frames and/or other assets. From the perspective of the device, a user will interact with the collection or bundle of frames downloaded from the server via the database, as depicted with FIG. 4. Once a user interacts with the collection of frames, their interactions are analyzed and cataloged based on a variety of interpretations, namely the traversing percentage, described in more detail below. The traversing percentage is used to determine certain elements of the engagement the user has with the collection of frames forming an advertisement. The user and advertiser may both benefit from the traversing percentage. Once a user generates an achievement, as a result of their interaction measured through the traversing percentage, they will unlock certain monetary or other incentivizing utility, including triggering an additional frame, with certain frames acting as an outbounding link or other form of advertisement incentive. The analysis created by the interaction of a user ultimately may be interpreted by the third party or advertiser granting a greater degree of the understanding of user behavior.

Traversing Percentage

Figure 5:
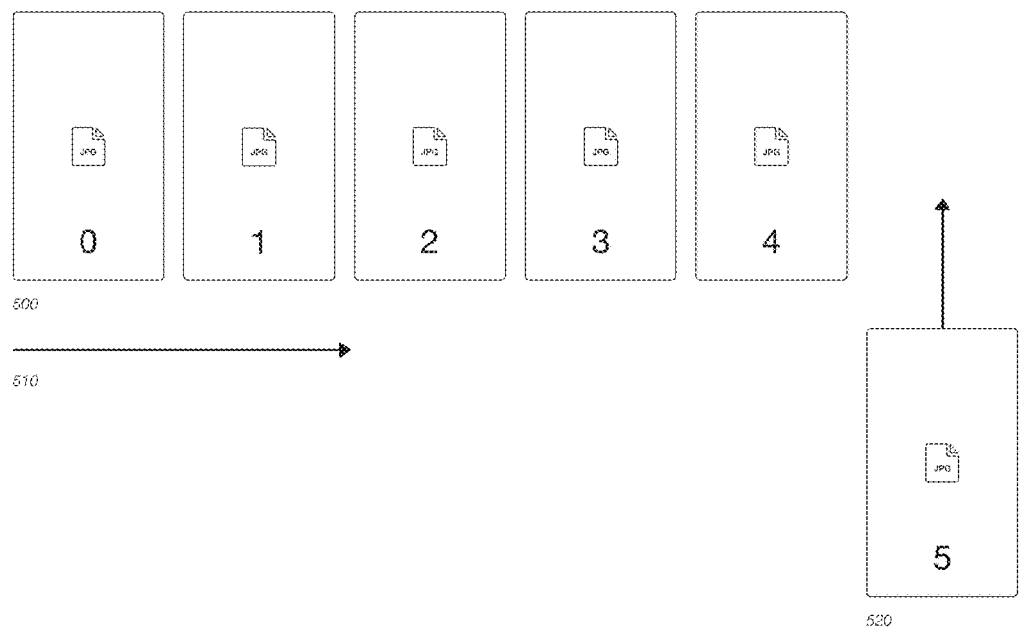
FIG. 5 is a schematic diagram illustrating an interactive advertisement based on a traversing percentage.

FIG. 5 illustrates an interactive advertisement based on a traversing percentage. The collection is triggered, as demonstrated through FIGS. 3A-3B and FIG. 4, by the interaction of a user passing over each evenly divided frame space. The frame space, which is determined as a result of taking the entire width of a screen divided by the number of frames present, creates an equal space associated with each frame that once traversed by a user, creates a direct control over the speed and directional movement consumed of each frame. The traversing percentage is referred to as the percentage of the device screen with which a user interacts. The traversing percentage is more specifically defined as, for the purposes of the technique presented, the percentage of total frames within a collection that a user traverses or interacts with, where each individual frame may be equally spaced throughout the available screen of the device. Although the technique grants a user unlimited and free control over the direction and speed at which they interact with the collection of frames, the complete percentage is referred to as a complete interaction with the total number of frames. As an example for the purposes of explanation, if a collection of frames includes ten total frames, a 100% traverse would be an interaction with all ten frames. From the perspective of the device, the interaction of the user with each evenly spaced frame is recorded and a percentage is produced. This percentage is used through a variety of methods in the process of the technique. The traversing percentage determined to qualify as a "viewed" advertisement can vary and can be determined by the advertiser, third-party, or the platform. The traversing percentage can represent a threshold percentage of the screen required to be traversed by a user. For example, a user may need to have traversed a certain percentage of the screen to unlock specific gamification elements set forth by advertisers or the platform. In FIG. 5, numeral 500 represents the collection of frames submitted through a third party, uploaded through a limited database period directly to the server. Arrow 510 represents the interaction of a user. In the figure, the interaction has moved through the first two frames, marked Frame 0 and Frame 1, creating a traversing percentage of forty.

The traversing percentage, for the purposes of the explanation of the figure, was determined by taking the number of frames traversed by the user (two, marked 0-1) divided by the total number of frames in the collection (six, marked 0-5), thus creating a traversing percentage of thirty-three (33). Numeral 520 represents a frame (marked 5) that is called directly from the server and temporarily stored in the database. Frame 5 was called after the traversing percentage has been completed by the user. Without the user passing the preset threshold value of the traversing percentage, in this case thirty-three (requiring the user to traverse frames 0-2), frame 5 would have not been called separately. In this example, the user is required to meet the preset traversing percentage in order to call any additional frames. These additional frames may include an outbounding link or any provided utility offered to incentivize a user, created by a third party, or through the platform, uploaded to the server directly by the platform or not. The percentage traversed does not require that the frames be traversed consecutively or in a particular order or from a specific starting point. The third party or platform may determine if the traversing percentage may be required for the implementation of any of these or other elements that in some way affect the analytics, end result, or process of the interaction of the user with a collection of frames and/or assets.

Figure 6:
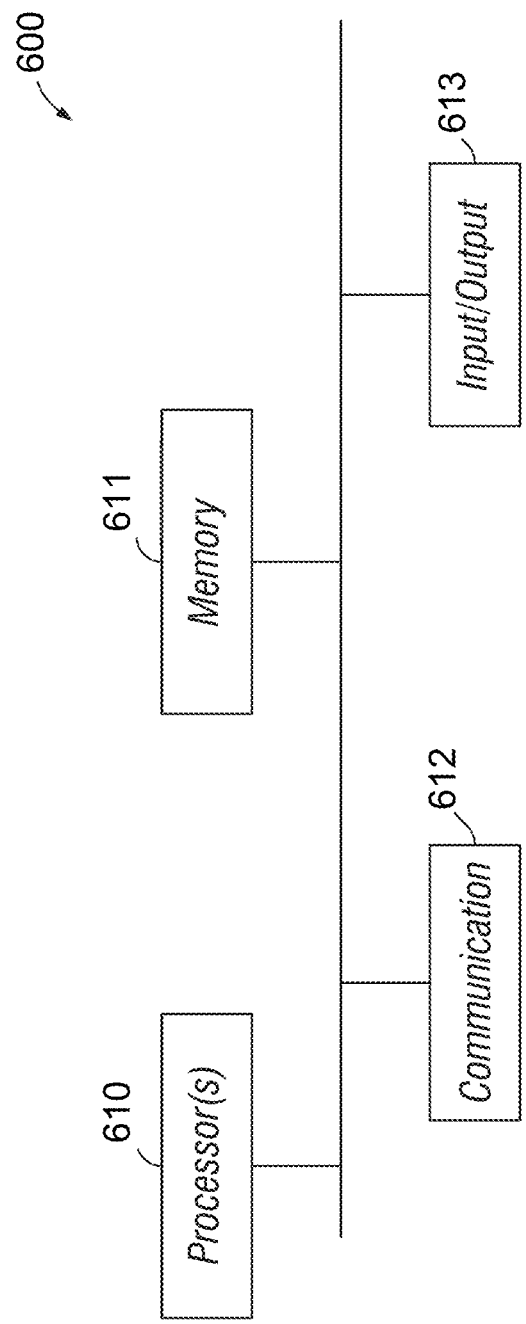
FIG. 6 is a high-level block diagram showing an example of a processing system in which at least some operations related to a workflow process can be implemented.

FIG. 6 is a high-level block diagram showing an example of a processing device 600 that can represent any of the devices described above. Any of these systems may include one or more processing devices such as represented in FIG. 6, which may be coupled to each other via a network or multiple networks.

In the illustrated embodiment, the processing system 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, adapters and/or other conventional connection devices. The processor(s) 610 may be or include, for example, one or more general-purpose programmable microprocessors, microcontrollers, application specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   capturing and storing, at a mobile device, a collection of assets;
   generating, at said mobile device, a traversing unit corresponding to the collection of assets, including use of a value representing a division of a width of a screen space of the mobile device by a number of assets in the collection, thereby resulting in a traversing unit that includes a plurality of equal subspaces on the screen space of the mobile device, each equal subspace corresponding to a different one of the assets of the collection; and
   upon receipt of an input gesture by a viewer, presenting, by said mobile device, part or all of the traversing unit, by, when an equal subspace has been traversed by said input gesture, an adjacent asset is presented and wherein a consumption rate at which each asset is presented is based on a speed and a directional movement of said input gesture.

2. The method of claim 1, wherein an asset is a frame and presenting the frame is displaying the frame.

3. The method of claim 1, wherein the input gesture is required to meet a predefined traversing percentage in order to download an additional frame, wherein a traversing percentage is defined by the number of assets traversed by the total number of assets in the collection.

4. The method of claim 3, wherein said additional asset includes an outbounding link to an external site or a utility offered to incentivize the viewer for purposes of monetizing the collection of assets.

5. The method of claim 1, wherein the collection of assets captured on the mobile device is uploadable as a bundle, instead of individually, for delivery to a server to achieve a fast and efficient uploading time to the server for storage; and
   wherein the mobile device is configured to download the bundle, instead of each individual asset, originating from the server to achieve a fast and efficient downloading of the collection of assets.

6. A server comprising:
   at least one processor operable to execute computer program instructions; and
   at least one memory operable to store the computer program instructions executable by said at least one processor, for performing:
   distributing, by a server, a collection of frames and/or other assets for delivery to a plurality of devices of users of a social networking system, wherein the collection of frames and/or other assets is configurable such that a width of a screen space of a device of the plurality of devices is divided equally by a number of frames and/or other assets delivered to the device and such that when a subspace has been traversed by an input gesture on the device, an adjacent frame and/or other asset of the collection is presented, such that each user has speed and directional control over the frames and/or other assets that are presented.

7. The server of claim 6, wherein each distributed collection of frames and/or other assets is associated with a public or private setting, wherein a private setting is defined to mean that the collection of frames and/or other assets are not sharable with or viewable by any other user and wherein a public setting is defined to mean that the collection of frames and/or other assets are sharable with or viewable by other users.

8. A server comprising:
at least one processor operable to execute computer program instructions; and
at least one memory operable to store the computer program instructions executable by said at least one processor, for performing:
receiving a collection of separately uploaded photographs or other assets captured on a non-mobile device; and
generating, a traversing unit corresponding to the collection of separately uploaded photographs or other assets, on including use of a value representing a division of a width of a predefined screen space value of a target mobile device by a number of the photographs or other assets in the collection, thereby resulting in a traversing unit that includes a plurality of equal subspaces on the predefined screen space of the mobile device, each equal subspace corresponding to a different member of the collection;
wherein the traversing unit is configured to be downloadable to the target mobile device and configured to be consumable by a user at a consumption rate based upon a speed and a directional movement of an input gesture of the user, wherein when an equal subspace has been traversed by the input gesture, an adjacent member of the collection is presented.

9. The server of claim 8, wherein the corresponding traversing unit is associated with a public or private setting, wherein a private setting is defined to mean that the collection of frames and/or assets are not sharable with or viewable by any other user and wherein a public setting is defined to mean that the collection of frames and/or assets are sharable with or viewable by other users.

10. A capture stream process comprising:
receiving a first user input depicting a frequency parameter for pulling a desired frame from a set of frames;
receiving, at a mobile device, a continuous stream of consecutive frames, for forming a collection of frames that is consumable by a viewer at the mobile device, until stopped by a second user input;
pulling frames from the continuous stream in sequence based on the frequency parameter;
using the pulled frames to form the collection of frames, wherein the collection of frames is configured to be controllable by a viewer controlling the speed and direction of the collection of frames on a display of the mobile device by:
causing a value representing a division of a width of a screen space of the mobile device by a number of frames in the collection to be used, thereby resulting in a plurality of equal subspaces on the screen space of the mobile device, each equal subspace corresponding to a different frame of the collection: and
causing, when an equal subspace has been traversed by an input gesture, an adjacent frame is presented.

11. The process of claim 10, wherein the second user input comprises a shutter delay or capture limit.

* * * * *